United States Patent
Hunt et al.

(10) Patent No.: US 9,534,969 B1
(45) Date of Patent: Jan. 3, 2017

(54) SYSTEM AND METHOD FOR TACTILE SENSING USING THIN FILM OPTICAL SENSING NETWORKS

(71) Applicant: The Boeing Company, Chicago, IL (US)

(72) Inventors: Jeffrey H. Hunt, Thousand Oaks, CA (US); Timothy E. Bridges, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/951,390

(22) Filed: Nov. 24, 2015

(51) Int. Cl.
*G01B 11/16* (2006.01)
*G01L 1/24* (2006.01)

(52) U.S. Cl.
CPC .............. *G01L 1/24* (2013.01); *G01B 11/16* (2013.01); *G01B 11/165* (2013.01)

(58) Field of Classification Search
CPC ....... G01B 11/16; G01B 11/165; G01B 11/18; G01L 1/24; G01M 11/086
See application file for complete search history.

(56) References Cited

U.S. PATENT DOCUMENTS

| | | | |
|---|---|---|---|
| 5,257,086 A * | 10/1993 | Fateley | G01J 3/10 250/553 |
| 9,068,925 B1 | 6/2015 | Hunt et al. | |
| 2004/0208439 A1* | 10/2004 | Bell | G02B 6/43 385/32 |
| 2004/0247223 A1* | 12/2004 | Tietjen | G01D 5/35383 385/7 |
| 2005/0276534 A1* | 12/2005 | Tietjen | G01H 9/004 385/12 |
| 2013/0333094 A1 | 12/2013 | Rogers et al. | |

OTHER PUBLICATIONS

Missine, J. and Van Hoe, B., Artificial Skin Based on Flexible Optical Tactile Sensors, SPIE Newsroom, 2010.
Ying, M. et al., Silicon Nanomembranes for Fingertip Electronics, Nanotechnology 23 (2012) pp. 1 to 7.

\* cited by examiner

*Primary Examiner* — Tarifur Chowdhury
*Assistant Examiner* — M D M Rahman
(74) *Attorney, Agent, or Firm* — John S. Economou

(57) ABSTRACT

A system and method for tactile sensing using thin film optical sensing networks is disclosed. A sensing network includes an array of optical pathways arranged in a flexible material. Each optical pathway has an input at a first end and an output at a second end. A light source is coupled to the input of each respective associated optical pathway. Each light source directs a light signal having a first predetermined frequency and characteristic into the associated optical pathway. A light detector is coupled to the output of each respective associated optical pathway. Each light detector receives a light signal from the associated optical pathway and generates an output signal corresponding to the magnitude of the received light signal at a second predetermined frequency. A processor receives the output signals from each light detector and determines an amount of pressure applied to the sensing network based on the received signals.

21 Claims, 4 Drawing Sheets

SYSTEM AND METHOD FOR TACTILE SENSING USING THIN FILM OPTICAL SENSING NETWORKS

FIELD

This disclosure relates generally to a system and method for tactile sensing using thin film optical sensing networks.

BACKGROUND

Many areas exist where it is beneficial to implement an artificial sense of touch. A tactile sensor is a transducer that can be used to provide this artificial sense of touch by measuring the force applied between a surface of the transducer and an object in contact with the transducer surface. Tactile sensors are commonly used in applications which involve handling or manipulation of an object (e.g., robotic grippers) to ensure that the amount of force applied to such object remains well below a level that might cause damage to the object but with enough force to adequately grip and control the object. Tactile sensors formed from pressure sensor arrays, strain gauge rosettes, or other electro-mechanical sensing systems are subject to permanent deformation when subjected to repetitive stresses during operation, providing shifting sensitivity, less than optimal reliability and a short life span.

Accordingly, there is a need for an improved system and method for tactile sensing which overcomes the problems recited above.

SUMMARY

In one aspect, a thin-film flexible tactile sensor includes a sensing network formed from an array of optical pathways arranged in a flexible material. Each of the optical pathways has an input at a first end thereof and an output at a second end thereof. The thin-film flexible tactile sensor also includes a plurality of light sources, one for each of the optical pathways. Each of the plurality of light sources is coupled to the input of a respective associated optical pathway. Each of the plurality of light sources directs a light signal having a first predetermined frequency and characteristic into the associated optical pathway. The thin-film flexible tactile sensor further includes a plurality of light detectors, one for each of the optical pathways. Each of the plurality of light detectors is coupled to the output of a respective associated optical pathway. Each of the plurality of light detectors receives a light signal from the associated optical pathway and generates an output signal corresponding to the magnitude of the received light signal at a second predetermined frequency. The thin-film flexible tactile sensor still further includes a processor coupled to receive the output signals from each of the plurality of light detectors. The processor is configured to determine an amount of pressure applied to the sensing network based on the received signals from the plurality of light detectors.

In another aspect, a thin-film flexible tactile sensor includes a sensing network formed from an array of one or more optical pathways arranged in a flexible material. Each of the optical pathways has an input at a first end thereof and an output at a second end thereof. The film flexible tactile sensor also includes one or more light sources, one for each of the optical pathways. Each of the one or more light sources is coupled to the input of a respective associated optical pathway. Each of the one or more light sources directs a light signal having a first predetermined frequency and characteristic into the associated optical pathway. The film flexible tactile sensor further includes one or more light detectors, one for each of the optical pathways. Each of the one or more light detectors is coupled to the output of a respective associated optical pathway. Each of the one or more light detectors receives a light signal from the associated optical pathway and generates an output signal corresponding to the magnitude of the received light signal at a second predetermined frequency. The film flexible tactile sensor still further includes a processor coupled to receive the output signals from each of the one or more light detectors. The processor is configured to determine an amount of pressure applied to the sensing network based on the received signals from the one or more light detectors.

In yet another aspect, a method for sensing pressure uses a sensing network formed from an array of optical pathways arranged in a flexible material. Each of the optical pathways has an input at a first end thereof and an output at a second end thereof. Light signals are directed into each of the optical pathways. Each of the light signals has a first predetermined frequency and characteristic. A light signal is received at the output of each of the optical pathways and output signals are generated corresponding to the magnitude of each received light signal at a second predetermined frequency at the output of the associated optical pathway. The output signals are processed to determine an amount of pressure applied to the sensing network.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
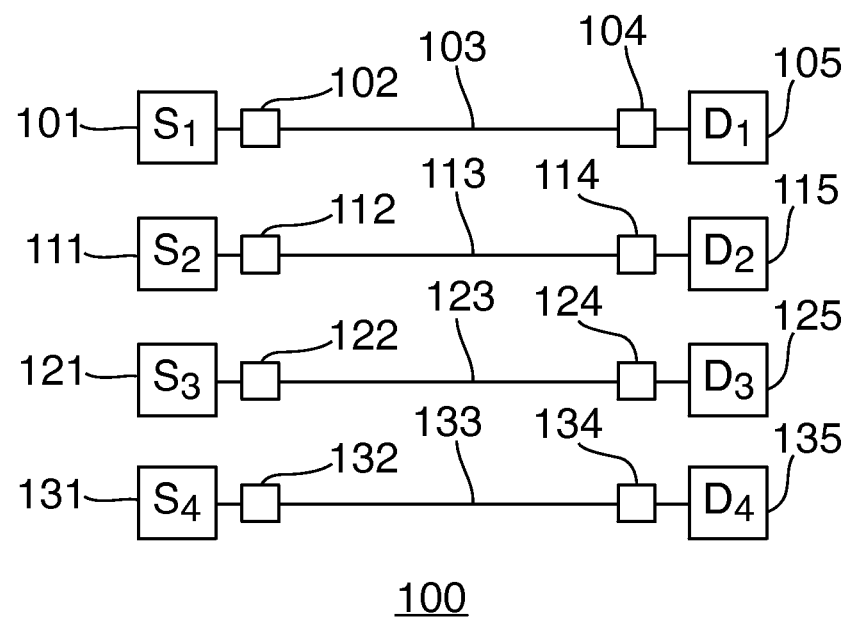
FIG. 1 is a block diagram illustrating an embodiment of a thin-film optical sensing network according to an aspect of the disclosure.

Referring now to FIG. 1, a first embodiment of a thin-film optical sensing network 100 is shown which consists of a number of straight optical pathways 103, 113, 123, 133 formed or positioned in an array in a thin flexible deformable material such as a suitable plastic. Each pathway 103, 113, 123, 133 may be a waveguide or equivalent formed in the plastic material or separate optical fibers positioned within the plastic material. Each optical pathway 103, 113, 123, 133 is coupled to an associated respective light source $S_1$ 101, $S_2$ 111, $S_3$ 121, $S_4$ 131 via input optics 102, 112, 122, 132 at a first end of the associated optical pathway 103, 113, 123, 133. In addition, each optical pathway 103, 113, 123, 133 is coupled to an associated respective detector $D_1$ 105, $D_2$ 115, $D_3$ 125, $D_4$ 135 via associated respective output optics 104, 114, 124, 134 at a second end of the associated optical pathway 103, 113, 123, 133. Each optical pathway 103, 113, 123, 133 acts as an optical strain gauge and, when the thin-film optical sensing network 100 is subjected to pressure stresses, the signals received by one or more of the detectors $D_1$ 105, $D_2$ 115, $D_3$ 125, $D_4$ 135 will reflect such pressure stresses. Although the embodiment shown in FIG. 1 shows four parallel optical pathways 103, 113, 123, 133, for all of the embodiments shown herein, the number of optical pathways included and the layout of each optical pathway may vary depending on the desired size and resolution of the sensing network.

In operation, each light source $S_1$ 101, $S_2$ 111, $S_3$ 121, $S_4$ 131 provides a predetermined light signal that passes through the associated respective optical pathway 103, 113, 123, 133 and ultimately to the associated respective detector $D_1$ 105, $D_2$ 115, $D_3$ 125, $D_4$ 135. The respective outputs of each of the detectors $D_1$ 105, $D_2$ 115, $D_3$ 125, $D_4$ 135 are then provided to a processor for appropriate processing and analysis (discussed below in further detail with respect to FIG. 6) to determine an amount and a location of any pressure being applied to thin-film optical sensing network 100. The thin-film optical sensing network 100 shown in FIG. 1 is much more sensitive and much more compact than conventional tactile sensors based on strain-gauge technology.

Figure 2:
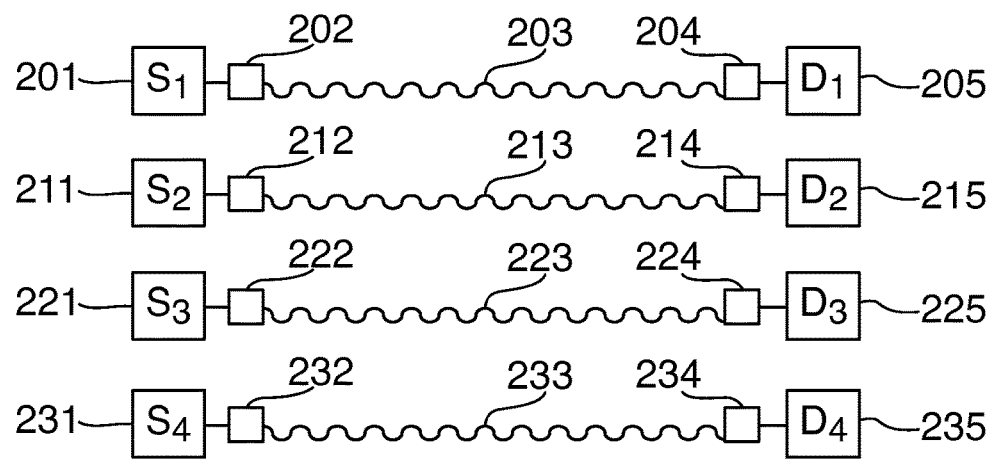
FIG. 2 is a block diagram illustrating a second embodiment of a thin-film optical sensing network according to an aspect of the disclosure.

Referring now to FIG. 2, a second embodiment of a thin-film optical sensing network 200 is shown which consists of a number of curved optical pathways 203, 213, 223, 233 that are, as with the FIG. 1 embodiment, formed or positioned in an array in a thin flexible deformable material such as a suitable plastic and may be either separate waveguides or the equivalent formed in the plastic material or separate optical fibers positioned within the plastic material. Each optical pathway 203, 213, 223, 233 is coupled to an associated respective light source $S_1$ 201, $S_2$ 211, $S_3$ 221, $S_4$ 231 via input optics 202, 212, 222, 232 at a first end of the associated optical pathway 203, 213, 223, 233. In addition, each optical pathway 203, 213, 223, 233 is coupled to an associated respective detector $D_1$ 205, $D_2$ 215, $D_3$ 225, $D_4$ 235 via associated respective output optics 204, 214, 224, 234 at a second end of the associated optical pathway 203, 213, 223, 233. Each optical pathway 203, 213, 223, 233 acts as an optical strain gauge and, when the thin-film optical sensing network 200 is subjected to pressure stresses, the signals received by one or more of the detectors $D_1$ 205, $D_2$ 215, $D_3$ 225, $D_4$ 235 will reflect such pressure stresses.

In operation, each light source $S_1$ 201, $S_2$ 211, $S_3$ 221, $S_4$ 231 provides a predetermined light signal that passes through the associated respective optical pathway 203, 213, 223, 233 and ultimately to the associated respective detector $D_1$ 205, $D_2$ 215, $D_3$ 225, $D_4$ 235. As with the FIG. 1 embodiment, the respective outputs of each of the detectors $D_1$ 205, $D_2$ 215, $D_3$ 225, $D_4$ 235 are then provided to a processor for appropriate processing and analysis to determine an amount and a location of any pressure being applied to thin-film optical sensing network 200.

Figure 3:
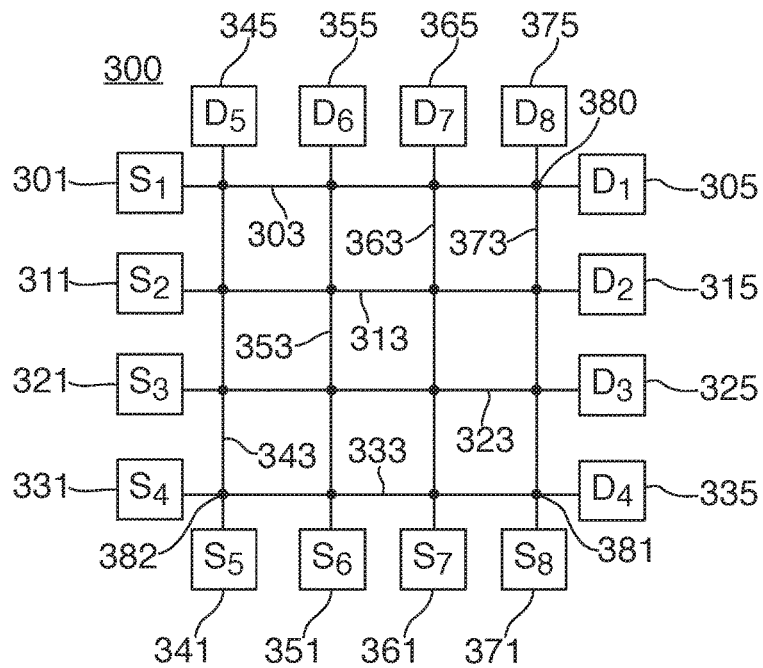
FIG. 3 is a block diagram illustrating a third embodiment of a thin-film optical sensing network according to an aspect of the disclosure.

Referring now to FIG. 3, a third embodiment of a thin-film optical sensing network 300 is shown which consists of a number of optical pathways 303, 313, 323, 333, 343, 353, 363, 373 formed or positioned in an array in a thin flexible deformable material such as a suitable plastic, and may be either separate waveguides or the equivalent formed in the plastic material or separate optical fibers positioned within the plastic material. As shown in FIG. 3, optical pathways 303, 313, 323, 333 are positioned in a first direction and optical pathways 343, 353, 363, 373 are positioned in a second direction perpendicular to the first direction. Optical pathways 303, 313, 323, 333, 343, 353, 363, 373 thus form a two-dimensional Cartesian grid. Each optical pathway 303, 313, 323, 333, 343, 353, 363, 373 may be straight as shown in FIG. 1 above or curved as shown in FIG. 2 above. Each optical pathway 303, 313, 323, 333, 343, 353, 363, 373 is coupled to an associated respective light source $S_1$ 301, $S_2$ 311, $S_3$ 321, $S_4$ 331, $S_5$ 341, $S_6$ 351, $S_7$ 361, $S_8$ 371 via input optics (not shown in FIG. 3) at a first end of the associated optical pathway 303, 313, 323, 333, 343, 353, 363, 373. In addition, each optical pathway 303, 313, 323, 333, 343, 353, 363, 373 is coupled to an associated respective detector $D_1$ 305, $D_2$ 315, $D_3$ 325, $D_4$ 335, $D_5$ 345, $D_6$ 355, $D_7$ 365, $D_8$ 375 via associated respective output optics (not shown in FIG. 3) at a second end of the associated optical pathway 303, 313, 323, 333, 343, 353, 363, 373. Each optical pathway 303, 313, 323, 333, 343, 353, 363, 373 acts as an optical strain gauge and, when the thin-film optical sensing network 300 is subjected to pressure stresses, the signals received by one or more of the detectors $D_1$ 305, $D_2$ 315, $D_3$ 325, $D_4$ 335, $D_5$ 345, $D_6$ 355, $D_7$ 365, $D_8$ 375 will reflect such pressure stresses. The dotted points (e.g., points 380, 381, 382) are included to show that the optical pathways are interconnected at such points (reference numbers are not included for each point for clarity in FIG. 3) to allow light from one optical pathway to be directed into another adjacent optical pathway, allowing for better sensitivity to the stress or strain induced in the plastic material.

In operation, each light source $S_1$ 301, $S_2$ 311, $S_3$ 321, $S_4$ 331, $S_5$ 341, $S_6$ 351, $S_7$ 361, $S_8$ 371 provides a predetermined light signal that passes through the associated respective optical pathway 303, 313, 323, 333, 343, 353, 363, 373 and ultimately to the associated respective detector $D_1$ 305, $D_2$ 315, $D_3$ 325, $D_4$ 335, $D_5$ 345, $D_6$ 355, $D_7$ 365, $D_8$ 375. The respective outputs of each of the detectors $D_1$ 305, $D_2$ 315, $D_3$ 325, $D_4$ 335, $D_5$ 345, $D_6$ 355, $D_7$ 365, $D_8$ 375 are then provided to a processor for appropriate processing and analysis (discussed below in further detail with respect to FIG. 6) to determine an amount and a location of any pressure being applied to thin-film optical sensing network 300.

Figure 4:
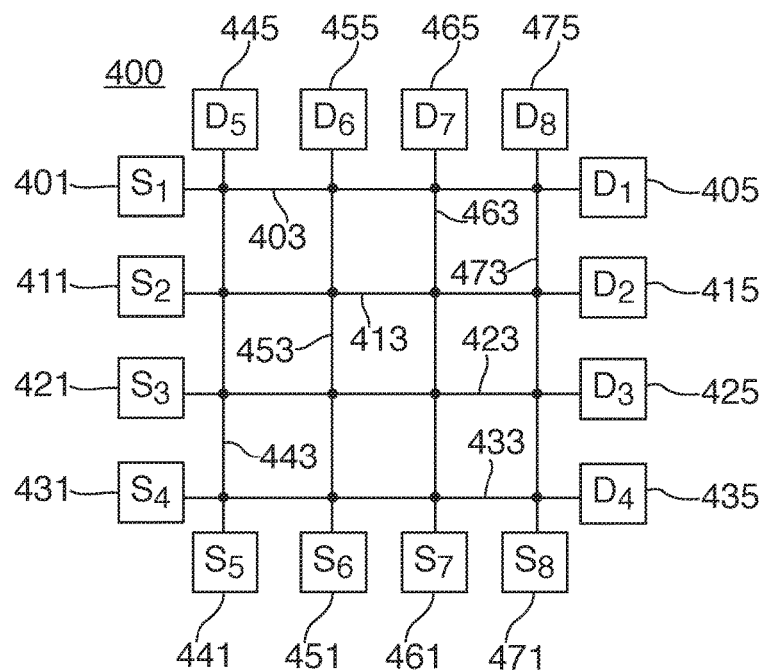
FIG. 4 is a block diagram illustrating a fourth embodiment of a thin-film optical sensing network according to an aspect of the disclosure.

Referring now to FIG. 4, a fourth embodiment of a thin-film optical sensing network 400 is shown which consists of a number of optical pathways 403, 413, 423, 433, 443, 453, 463, 473 formed or positioned in an array in a thin flexible deformable material such as a suitable plastic, and may be either separate waveguides or the equivalent formed in the plastic material or separate optical fibers positioned within the plastic material. This embodiment is similar to the FIG. 3 embodiment, except the optical pathways 403, 413, 423, 433, 443, 453, 463, 473 are not interconnected at the crossing points such no light is ever diverted from one of the optical pathways 403, 413, 423, 433, 443, 453, 463, 473 to another of the optical pathways 403, 413, 423, 433, 443, 453, 463, 473. As with the FIG. 3 embodiment, optical pathways 403, 413, 423, 433, 443, 453, 463, 473 form a two-dimensional Cartesian grid. Each optical pathway 403, 413, 423, 433, 443, 453, 463, 473 may be straight as shown in FIG. 1 above or curved as shown in FIG. 2 above. Each optical pathway 403, 413, 423, 433, 443, 453, 463, 473 is coupled to an associated respective light source $S_1$ 401, $S_2$ 411, $S_3$ 421, $S_4$ 431, $S_5$ 441, $S_6$ 451, $S_7$ 461, $S_8$ 471 via input optics (not shown in FIG. 4) at a first end of the associated optical pathway 403, 413, 423, 433, 443, 453, 463, 473. In addition, each optical pathway 3403, 413, 423, 433, 443, 453, 463, 473 is coupled to an associated respective detector $D_1$ 405, $D_2$ 415, $D_3$ 425, $D_4$ 435, $D_5$ 445, $D_6$ 455, $D_7$ 465, $D_8$ 475 via associated respective output optics (not shown in FIG. 3) at a second end of the associated optical pathway 403, 413, 423, 433, 443, 453, 463, 473. Each optical pathway 403, 413, 423, 433, 443, 453, 463, 473 acts as an optical strain gauge and, when the thin-film optical sensing network 400 is subjected to pressure stresses, the signals received by one or more of the detectors $D_1$ 405, $D_2$ 415, $D_3$ 425, $D_4$ 435, $D_5$ 445, $D_6$ 455, $D_7$ 465, $D_8$ 475 will reflect such pressure stresses.

In operation, each light source $S_1$ 401, $S_2$ 411, $S_3$ 421, $S_4$ 431, $S_5$ 441, $S_6$ 451, $S_7$ 461, $S_8$ 471 provides a predetermined light signal that passes through the associated respective optical pathway 403, 413, 423, 433, 443, 453, 463, 473 and ultimately to the associated respective detector $D_1$ 405, $D_2$ 415, $D_3$ 425, $D_4$ 435, $D_5$ 445, $D_6$ 455, $D_7$ 465, $D_8$ 475. The respective outputs of each of the detectors $D_1$ 405, $D_2$ 415, $D_3$ 425, $D_4$ 435, $D_5$ 445, $D_6$ 455, $D_7$ 465, $D_8$ 475 are then provided to a processor for appropriate processing and analysis (discussed below in further detail with respect to FIG. 6) to determine an amount and a location of any pressure being applied to thin-film optical sensing network 400.

Figure 5:
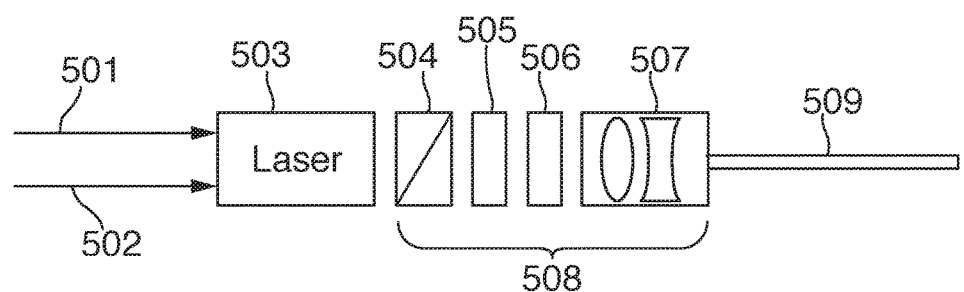
FIG. 5 is a block diagram illustrating an optical light source and input optics for use with the thin-film optical sensing networks of the present disclosure.

Referring now to FIG. 5, the light source and input optics coupled to each optical pathway in the embodiments shown in FIGS. 1 to 4 are show in greater detail. In particular a laser light source 503 includes an electrical input 501 coupled to a power source and a control input 502. The control input 502 may be coupled to a processor such as processor 608 shown in FIG. 6 or to a separate control processor (not shown). The laser light source 503 may be a diode laser or a solid state laser. The output of the laser light source 503 is directed through the input optics 508 and then onto an optical pathway 509. The input optics preferably include a polarizer 504, a polarization rotator 505, a wavelength selector 506 and optical pathway injection optics 507. The polarizer 504 may be a solid state device or be film-based. The polarization rotator 505 is optional and rotates the polarization axis of the linearly polarized light beam from the laser light source 503/polarizer 504 by an angle of choice. The wavelength selector 506 acts as a notch filter to pass only the desired wavelength of light from laser light source 503. The optical pathway injection optics 507 are lenses that focus the beam of light from laser light source 503 onto the optical pathway 509. In some cases, as discussed below, two separate light sources may be used to excite each optical pathway. In such cases, an optical coupler may be used to combine the output of each light source (after such output passes though the output optics) onto the optical fiber.

Figure 6:
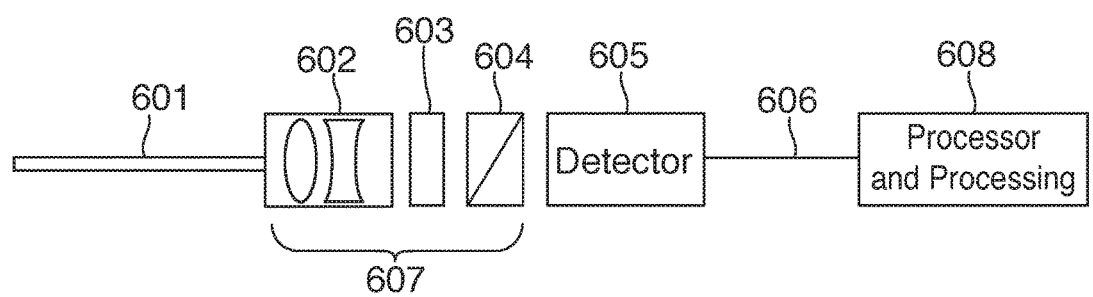
FIG. 6 is a block diagram illustrating the output optics and detector for use with the thin-film optical sensing networks of the present disclosure.

Referring now to FIG. 6, the output optics and light detector coupled to each optical pathway in the embodiments shown in FIGS. 1 to 4 are shown in greater detail, along with the processor used to generate an output signal based on pressure applied to the respective embodiments of the thin-film optical sensing network shown in FIGS. 1 to 4. In particular, an optical pathway 601 is shown coupled to the output optics 607 consisting of capture optics 602, a wavelength selector 603, and a polarization selector 604, which in turn is coupled to a light detector 605 having an output coupled to a processor 608 via a link 606. The capture optics 602 are lenses that collect the light from optical pathway 601 and direct such light towards detector 605 through the remaining portions of output optics 607. The wavelength selector 603 is selected to pass only the wavelength of interest in the light received from optical pathway 601. The polarization selector 604 ensures that the appropriate level of polarization is provided to detector 605. The detector 605 is a conventional light detector that generates an electrical output signal on link 606 proportional to the amount of light received. The processor 608 receives the electrical signals from each detector 604 in the thin-film optical sensing network (although only one detector 604 is shown in FIG. 6, all of the embodiments of a thin-film optical sensing network disclosed herein include a plurality of detectors, each coupled to the processor for processing) and generates an output signal proportional to the amount of pressor applied to that network. In addition, processor 608 may also generate a separate signal indicating, in a two-dimensional plane, where such pressure is applied within the thin-film optical sensing network.

When pressure is applied to any of the disclosed embodiments of a thin-film optical sensing network, the induced pressure causes localized changes in the microscopic non-linearities of the embedded optical pathways. In particular, by inducing stress in the optical pathways, the material forming such optical pathways moves out of its equilibrium state, increasing local nonlinearities. The pressure sensing systems disclosed herein takes advantage of this change which causes changes to the nonlinear optical properties of the materials forming the optical pathways. In particular, by applying a light signal having a particular characteristic to each optical pathway, and monitoring a responsive (but non-linear) characteristic, the disclosed systems provide a much higher signal-to-noise response than previous linear systems.

When a single light signal is applied to each optical pathway, such light signal will have a predetermined wavelength and polarization. When two light signals are applied to each optical pathway, each of the light signals will have a predetermined wavelength and polarization. To take advantage of the non-linear optical properties of the materials forming the optical pathways, the responsive signal monitored at the output end of each optical pathway in both cases (single light signals and two light signals) will have a different predetermined wavelength and polarization that have magnitudes that change as pressure is applied to the optical pathway. As such, the output signals generated can be based on a change in magnitude of the received signal at the particular wavelength and/or based on a change in the polarization of such signal at that wavelength. When a single light signal is applied to each optical pathway, the predetermined wavelength and/or polarization monitored at the output of each optical pathway can be selected based on a number of different cases, including, for example, second harmonic generation (output will have twice the wavelength of the input wavelength) and Raman Scattering (output selected based on Raman Stokes or Anti-Stokes peaks). When two light signals are applied to each optical pathway, the predetermined wavelength and/or polarization monitored at the output of each optical pathway can be selected based on, for example, sum-frequency generation (output wavelength at the sum of the two input wavelengths), difference-frequency generation (output wavelength at difference of two input wavelengths), and simulated Raman Scattering (output wavelength at twice one of the input wavelengths less the other input wavelengths).

By using optical pathways formed in a deformable material such as a plastic or optical fibers positioned within such a deformable material, the thin-film sensing networks disclosed herein avoid the various problems that arise due to permanent deformation in conventional electro-mechanical pressure sensors.

In operation, each of optical pathways causes variations in the magnitude of light transmitted there through to the second end when pressure is applied to an optical pathway in a region in the array of optical pathways, or to a region in the array of optical pathways. The processor determines the amount of pressure applied to the region of the array of optical pathways based at least on changes in the output signals from the one or more light detectors (e.g., a change in magnitude of light at the second predetermined frequency) coupled to the one or more optical pathways to which a pressure was applied.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A thin-film flexible tactile sensor, comprising:
   a sensing network formed from an array of optical pathways arranged in a flexible material, each of the optical pathways having an input at a first end thereof and an output at a second end thereof;
   a plurality of light sources, one for each of the optical pathways, each of the plurality of light sources coupled to the input of a respective associated optical pathway, each of the plurality of light sources directing a light signal having a first predetermined frequency and characteristic into the associated optical pathway;
   a plurality of light detectors, one for each of the optical pathways, each of the plurality of light detectors coupled to the output of a respective associated optical pathway, each of the plurality of light detectors receiving a light signal from the associated optical pathway and generating an output signal corresponding to the magnitude of the received light signal at a second predetermined frequency; and
   a processor coupled to receive the output signals from each of the plurality of light detectors and configured to determine an amount of pressure applied to the sensing network based on the received signals from the plurality of light detectors; and
   wherein each of optical pathways causes variations in the magnitude of light transmitted therethrough to the second end when pressure is applied to an optical pathway in a region in the array, and wherein the processor is configured to determine the amount of pressure applied to the region of the array of optical pathways based at least on changes in the output signals from the one or more light detectors coupled to the one or more optical pathways to which a pressure was applied.

2. The thin-film flexible tactile sensor of claim 1, wherein the processor is further configured to determine a location within the tactile sensor of the amount of pressure applied to the sensing network based on the received signals from the plurality of light detectors.

3. The thin-film flexible tactile sensor of claim 1, further comprising input optics coupled between each of the plurality of light sources and the input of the associated optical pathway.

4. The thin-film flexible tactile sensor of claim 3, wherein the input optics comprise at least one of a polarizer, a polarization rotator and a wavelength selector.

5. The thin-film flexible tactile sensor of claim 1, further comprising output optics coupled between each of the plurality of light detectors and the output of the associated optical pathway.

6. The thin-film flexible tactile sensor of claim 5, wherein the output optics comprise at least one of a wavelength selector and a polarization selector.

7. The thin-film flexible tactile sensor of claim 1, wherein pressure is applied to an optical pathway when pressure is applied to a region of the array of optical pathways.

8. The thin-film flexible tactile sensor of claim 1, wherein the processor is configured to determine the amount of pressure applied to the region of the array of optical pathways based at least on changes in the output signals from the one or more light detectors reflective of a change in magnitude of light at the second predetermined frequency transmitted to the second end of the one or more optical pathways to which a pressure was applied.

9. The thin-film flexible tactile sensor of claim 1, wherein the second predetermined frequency is twice the first predetermined frequency.

10. The thin-film flexible tactile sensor of claim 1, wherein the second predetermined frequency corresponds to Raman Stokes Outputs or Raman Anti-Stokes Outputs of the first predetermined frequency.

11. The thin-film flexible tactile sensor of claim 1, further comprising:
    a plurality of second light sources, one for each of the optical pathways, each of the plurality of second light sources coupled to the input of a respective associated optical pathway, each of the plurality of second light sources directing a light signal having a third predetermined frequency and characteristic into the associated optical pathway; and
    wherein the second predetermined frequency is determined based on a function of the first predetermined frequency and the third predetermined frequency.

12. The thin-film flexible tactile sensor of claim 11, wherein the function corresponds to a sum-frequency function.

13. The thin-film flexible tactile sensor of claim 11, wherein the function corresponds to a difference-frequency function.

14. The thin-film flexible tactile sensor of claim 11, wherein the function corresponds to a simulated Raman Scattering function.

15. The thin-film flexible tactile sensor of claim 1, wherein the optical pathways form a two-dimensional Cartesian grid and wherein the optical pathways are connected at each crossing point within the two-dimensional Cartesian grid.

16. The thin-film flexible tactile sensor of claim 1, wherein each of the optical pathways is formed within the flexible material.

17. The thin-film flexible tactile sensor of claim 1, wherein each of the optical pathways is a separate optical fiber positioned within the flexible material.

18. A thin-film flexible tactile sensor, comprising:
a sensing network formed from an array of one or more optical pathways arranged in a flexible material, each of the optical pathways having an input at a first end thereof and an output at a second end thereof;
one or more light sources, one for each of the optical pathways, each of the one or more light sources coupled to the input of a respective associated optical pathway, each of the one or more light sources directing a light signal having a first predetermined frequency and characteristic into the associated optical pathway;
one or more light detectors, one for each of the optical pathways, each of the one or more light detectors coupled to the output of a respective associated optical pathway, each of the one or more light detectors receiving a light signal from the associated optical pathway and generating an output signal corresponding to the magnitude of the received light signal at a second predetermined frequency;
a processor coupled to receive the output signals from each of the one or more light detectors and configured to determine an amount of pressure applied to the sensing network based on the received signals from the one or more light detectors; and
wherein each of optical pathways causes variations in the magnitude of the light transmitted therethrough to the second end when pressure is applied to an optical pathway in a region in the array, and wherein the processor is configured to determine the amount of pressure applied to the region of the array of optical pathways based at least on changes in the output signals from the one or more light detectors reflective of a change in magnitude of light at the second predetermined frequency transmitted to the second end of the one or more optical pathways to which a pressure was applied.

19. The thin-film flexible tactile sensor of claim 18, wherein the processor is further configured to determine a location within the tactile sensor of the amount of pressure applied to the sensing network based on the received signals from the one or more light detectors.

20. A method for sensing pressure using a sensing network formed from an array of optical pathways arranged in a flexible material, each of the optical pathways having an input at a first end thereof and an output at a second end thereof, comprising the steps of:
directing light signals into each of the optical pathways, each of the light signals having a first predetermined frequency and characteristic;
at the output of each of the optical pathways, receiving a light signal and generating an output signal corresponding to the magnitude of the received light signal at a second predetermined frequency at the output of the associated optical pathway; processing the output signals to determine an amount of pressure applied to the sensing network; and
wherein each of optical pathways causes variations in the magnitude of light transmitted therethrough to the second end when pressure is applied to an optical pathway in a region in the array, and wherein the step of processing the output signals comprises determining the amount of pressure applied to the region of the array of optical pathways based at least on changes in the output signals.

21. The method of claim 20, further comprising the step of processing the output signals to determine a location within the sensing network of the amount of pressure applied to the sensing network.

\* \* \* \* \*